June 12, 1951 J. H. MULLIGAN, JR., ET AL 2,556,934

VARIABLE DELAY CIRCUIT

Filed Oct. 18, 1947

INVENTORS
James H. Mulligan, Jr.
Arthur J. Talamini
BY Charles W. Mortimer
ATTORNEY Patented June 12, 1951 2,556,934

UNITED STATES PATENT OFFICE 2,556,934

VARIABLE DELAY CIRCUIT

James H. Mulligan, Jr., East Orange, and Arthur J. Talamini, Jr., Caldwell Township, Essex County, N. J., assignors to Allen B. Du Mont Laboratories, Inc., Passaic, N. J., a corporation of Delaware Application October 18, 1947, Serial No. 780,639

3 Claims. (Cl. 250—27)

This invention relates to a delay multivibrator that is particularly useful in television pick-up devices, although it is not limited to this use.

When utilizing televison signals from several pick-up devices controlled by the same synchronizing signals the varying lengths of cable to the different pick-ups result in the signals from the different pick-ups being out of synchronization with each other. Each cable introduces a delay in proportion to the length of cable that connects it to the synchronizing signal generator and as the lengths may differ widely and vary from time to time with different production arrangements a corrective factor of a controllable amount is needed to compensate for delay. This corrective factor may be introduced to delay the signal of the pick-up with the shorter cable or to anticipate the delay in the longer pick-up cable. The ordinary type of artificial delay line with lumped constants is likely to be too bulky and not readily adjustable. A multivibrator may be utilized, but it would be off for only a very small portion of the cycle if used for this purpose. Multivibrators do not give reliable operation under these conditions.

With the present invention a multivibrator may be used that needs to be on for approximately only half a cycle. This is accomplished by generating a trigger pulse at the television line repetition rate delayed a half line, and transmitting this pulse over the cable to the pick-up where it triggers a multivibrator. The duration of the pulse of this multivibrator may be controlled by a variable resistor to give varying time delays either more or less than the duration of a line when differentiated. This device is particularly useful in the system described in application, Ser. No. 780,638, filed herewith, entitled "Television Synchronizing Signal Generator," although its use is not restricted to that system.

The invention may be understood from the description in connection with the acompanying drawing in which.

Figure 1:
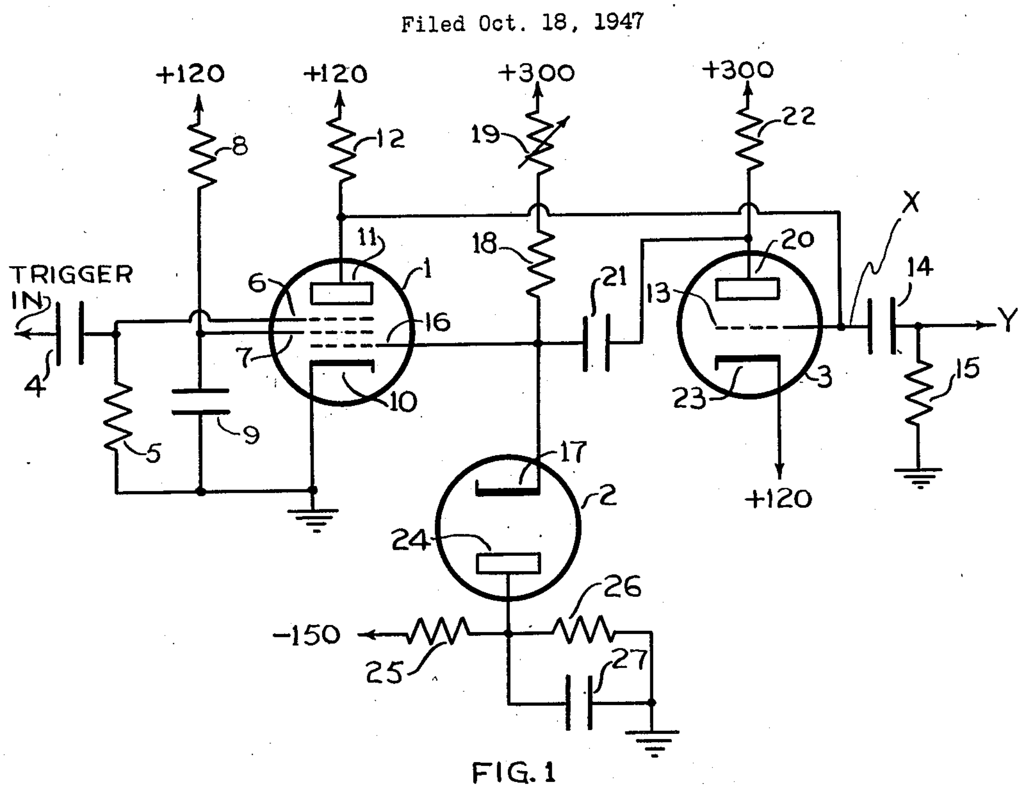
Fig. 1 shows a diagrammatic embodiment of the invention.

Three vacuum tubes are provided which are respectively a pentode 1, a diode 2 and a triode 3. Horizontal triggering pulses delayed one half line are applied from a source of such pulses, as is shown in the above mentioned application, through capacitor 4 across resistor 5 to the suppressor grid 6 of tube 1. The screen grid 7 of this tube is connected to a source of positive potential through resistor 8 and to ground through capacitor 9. The cathode 10 is grounded. The plate 11 is connected to a source of opposite potential through resistor 12 and also to control grid 13 of triode 3. Control grid 13 of tube 3 is also connected to ground through capacitor 14 and resistor 15 that are connected in series.

The control grid 16 of tube 1 is connected to the cathode 17 of a diode 2 and to a source of positive potential through resistor 18 and variable resistor 19, and to plate 20 of triode 3 through capacitor 21. Plate 20 is also connected to a source of positive potential through resistor 22. The cathode 23 of triode 3 is connected to the same source of positive potential to which resistor 12 is connected which is at a lower value than that to which the plate 20 of tube 3 is connected. Plate 24 of diode 2 is connected to a source of negative potential through resistor 25 and to ground through resistor 26 and capacitor 27 connected in parallel.

The operation is as follows:

Control grid 16 of tube 1 is normally at a positive potential with respect to ground because it is tied to a source of positive potential through resistors 18 and 19, so that space current flows through tube 1 thereby causing a voltage drop in resistor 12. This voltage drop causes the potential of plate 11 of tube 1 and grid 13 of tube 3 to assume a potential somewhat lower than that of the cathode 23. This negative potential on grid 13 is sufficient to cut off tube 3. Tube 1 is conducting, since its control grid 16 and plate 11 are connected to sources of sufficiently high positive potentials.

Negative trigger signals from the pick-up auxiliary unit 7a (shown in Fig. 1 of the abovementioned application) are applied to the suppressor grid 6 of tube 1. These negative pulses cut off plate current through tube 1, thus allowing the voltage on grid 13 of tube 3 to increase, initiating conduction through this tube. The resulting negative voltage swing at its plate is coupled through capacitor 21 to control grid 16 of tube 1, thus keeping plate current cut off in tube 1 after the suppressor trigger passes. Tube 1 is now cut off and tube 3 is conducting. After an interval determined primarily by the values of resistors 18 and 19, capacitor 21, and the initial voltage change on grid 16, the voltage on grid 16 becomes more positive than cut-off. The circuit then returns to the original condition pending action of the next trigger.

Diode 2 limits the negative swing of grid 16 to approximately 50 volts. This stabilizes the operation of the circuit by insuring that the voltage swing of grid 16 will be nearly independent of the voltage swing of plate 20 of tube 3.

Figure 2:
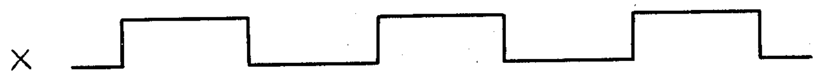
Figs. 2 and 3 show certain waveforms, as described below.
Figure 3:
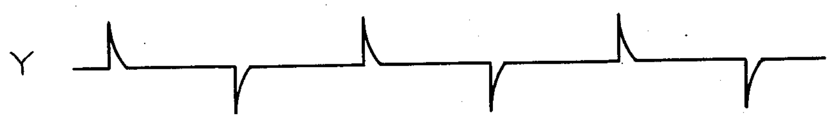

The positive gate signal X which is present at the plate 11 of tube 1 and at the grid 13 of tube 3 is shown in Fig. 2. This signal when differentiated in the known way, gives the waveform Y shown in Fig. 3. The negative pulses in Fig. 3 correspond to the variable rear edge of the cable delay multivibrator which is made variable by adjusting resistor 19 to give the desired delay to the horizontal driving pulses. Thus a one half line variable delay in this device, plus a one half line fixed delay generated in the device described in our co-pending application, Ser. No. 780,641, entitled "A Coincidence Blocking Tube Oscillator," filed herewith, allow a full period (horizontal delay) variable before or after the basic horizontal trigger time.

What is claimed is:

1. A variable delay circuit comprising an electron discharge device having a cathode, a plate, a control grid, a screen grid and a suppressor grid, a second electron discharge device having a cathode, a plate and a control grid, said first electron discharge device being connected to receive negative triggering pulses applied to the suppressor grid thereof, the plate of said first discharge device being connected by a direct wire connection to the control grid of said second discharge device and to a source of positive potential through a resistor, the plate of said second discharge device being coupled to the control grid of said first device through a condenser and to a source of positive potential through a resistor, a third electron discharge device having a cathode and an anode, the cathode thereof being connected to the control grid of said first device and the anode thereof being connected to a source of negative potential, a variable resistor connected between a source of positive potential and the control grid of said first device, and means for taking an output from the plate of said first discharge device.

2. A variable delay circuit comprising an electron discharge tube having a cathode, an anode, and a plurality of grids, a second electron discharge tube having a cathode, an anode and a control grid, the anode of said first tube being connected by a direct wire connection to the control grid of said second tube and to a source of positive potential, the anode of said second tube being connected to a first grid of said first tube through a capacitor and to a source of positive potential, a variable resistor connected between a source of positive potential and said first grid of said first tube, a third electron discharge tube having the cathode thereof connected to said first grid of said first tube, and the anode thereof connected to a source of negative potential, a second grid of said first tube being connected to a source of electrical triggering pulses, and a utilization circuit connected to the anode of said first tube.

3. A variable delay circuit for electrical pulses comprising a first thermionic tube having a cathode and anode and a plurality of grids, a second thermionic tube, having a cathode, an anode and a grid, the anode of said first tube being connected to the grid of said second tube by a direct wire connection, and the anode of said second tube being connected to the first grid of said first tube through a capacitor, the anode of each said first tube and said second tube being connected to a source of positive potential, a diode thermionic tube having the cathode thereof connected to said first grid of said first tube and the anode thereof connected to a source of negative potential, a variable resistor connected between a source of positive potential and said first grid of said first tube, a second grid of said first tube being connected to a source of electrical triggering pulses, and a differentiating circuit comprising a resistor and a capacitor connected to the anode of said first tube whereby pulses appearing across said differentiating circuit may be varied in time with variation in said variable resistor.

JAMES H. MULLIGAN, Jr.
ARTHUR J. TALAMINI, Jr.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,390,608 | Miller et al. | Dec. 11, 1945 |
| 2,402,916 | Schroeder | June 25, 1946 |
| 2,405,237 | Ruhlig | Aug. 6, 1946 |
| 2,418,364 | Moe | Apr. 1, 1947 |
| 2,421,018 | DeRosa | May 27, 1947 |
| 2,423,931 | Etter | July 15, 1947 |
| 2,431,591 | Snyder et al. | Nov. 25, 1947 |
| 2,442,769 | Kenyon | June 8, 1948 |

OTHER REFERENCES

Time Bases, 1943; by Puckle, pages 50–53. John Wiley & Sons, Inc.